(12) United States Patent
Fokoue-Nkoutche et al.

(10) Patent No.: US 10,025,795 B2
(45) Date of Patent: Jul. 17, 2018

(54) SYSTEMS AND METHODS FOR QUERY EVALUATION OVER DISTRIBUTED LINKED DATA STORES

(71) Applicant: International Business Machines Corporation, Armonk, NY (US)

(72) Inventors: Achille B. Fokoue-Nkoutche, White Plains, NY (US); Anastasios Kementsietsidis, Mountain View, CA (US); Spyros Kotoulas, Dublin (IE); Muhammad Mustafa Rafique, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 14/666,837

(22) Filed: Mar. 24, 2015

(65) Prior Publication Data
US 2016/0283511 A1    Sep. 29, 2016

(51) Int. Cl.
*G06F 17/30* (2006.01)

(52) U.S. Cl.
CPC .. *G06F 17/30194* (2013.01); *G06F 17/30451* (2013.01); *G06F 17/30867* (2013.01); *G06F 17/30958* (2013.01)

(58) Field of Classification Search
CPC ......... G06F 17/30194; G06F 17/30451; G06F 17/30867; G06F 17/30958
See application file for complete search history.

(56) References Cited

U.S. PATENT DOCUMENTS

| | | | |
|---|---|---|---|
| 6,980,985 B1 | 12/2005 | Amer-Yahia et al. | |
| 7,181,442 B2 | 2/2007 | Yeh et al. | |
| 7,593,931 B2 | 9/2009 | Zuzarte et al. | |
| 7,680,779 B2 * | 3/2010 | Chaves | G06F 17/3051 707/770 |
| 7,698,324 B2 | 4/2010 | Vries | |

(Continued)

OTHER PUBLICATIONS

Quilitz B., Leser U. (2008) Querying Distributed RDF Data Sources with SPARQL. In: Bechhofer S., Hauswirth M., Hoffmann J., Koubarakis M. (eds) The Semantic Web: Research and Applications. ESWC 2008. Lecture Notes in Computer Science, vol. 5021. Springer, Berlin, Heidelberg.*

(Continued)

*Primary Examiner* — Mark D Featherstone
*Assistant Examiner* — Faezeh Forouharnejad
(74) *Attorney, Agent, or Firm* — Yeen Tham; Ryan, Mason & Lewis, LLP

(57) ABSTRACT

A method for query evaluation comprises receiving a query over a set of distributed data sources, decomposing the query into a set of sub-queries of the query, evaluating each sub-query in the set of sub-queries with respect to each data source in the set of distributed data sources, wherein evaluating comprises determining which data sources in the set of distributed data sources are capable of answering each sub-query and at what cost, computing a set of distributed plans by composing one or more of the sub-queries in one or more of the data sources, evaluating each plan in the set of distributed plans, selecting a sub-set of plans from the set of distributed plans to be executed for responding to the query, executing the selected sub-set of plans, and returning results of the query.

8 Claims, 5 Drawing Sheets

(56) References Cited

U.S. PATENT DOCUMENTS

| | | | |
|---|---|---|---|
| 8,285,711 B2 | 10/2012 | Bordawekar et al. | |
| 8,335,783 B2 | 12/2012 | Milby | |
| 2005/0203901 A1* | 9/2005 | Waldvogel | G06F 17/30545 |
| 2009/0006329 A1 | 1/2009 | Cong et al. | |
| 2009/0248631 A1 | 10/2009 | Alba et al. | |
| 2010/0094819 A1 | 4/2010 | Bornhoevd et al. | |
| 2010/0169351 A1* | 7/2010 | Kulkarni | 707/759 |
| 2014/0101178 A1* | 4/2014 | Ginter | G06F 17/30979 |
| | | | 707/755 |
| 2015/0088807 A1* | 3/2015 | Toppin | G06F 17/30563 |
| | | | 707/602 |

OTHER PUBLICATIONS

A. Matono et al., "P2P-Based Query Processing for Distributed RDF Databases Using a Three-Dimensional Hash Index," Information Processing Society of Japan (IPSJ), Transactions on Databases (TOD), Jun. 2006, pp. 121-133, vol. 47, No. 8.

T. Imielinski et al., "DataSpace: Querying and Monitoring Deeply Networked Collections in Physical Space," IEEE Personal Communications, Oct. 2000, pp. 4-9, vol. 7, No. 5.

Wikipedia, "Graph Database," http://en.wikipedia.org/wiki/Graph_database#APIs_and_Graph_Query.2FProgramming_Languages, Feb. 2015, 13 pages.

\* cited by examiner

FIG. 1

| INTEGRATION PLATFORM | ACCESS POINTS | LINEAGE | AUTONOMY | HETEROGENEITY | QUERYING | TRANSACTION | PERFORMANCE |
|---|---|---|---|---|---|---|---|
| DATA WAREHOUSING | 1 | OPAQUE | TIGHT | HOMOGENEOUS | PRE-DETERMINED | YES | HIGH |
| DISTRIBUTED DATA INTEGRATION SYSTEMS | 1 | OPAQUE | TIGHT | HOMOGENEOUS | PRE-DETERMINED | YES | HIGH |
| FEDERATED DATA INTEGRATION SYSTEMS | 1 OR n | OPAQUE | TIGHT | HETEROGENEOUS [STRUCTURAL] | PRE-DETERMINED | NO (TYPICALLY) | HIGH |
| LINKING DATA INTEGRATION SYSTEMS | 1 OR n | TRANSPARENT/ OPAQUE | AUTONOMOUS | HETEROGENEOUS [STRUCTURAL AND SEMANTIC] | AD-HOC AND PRE-DETERMINED | NO (TYPICALLY) | LOW |

400

SYSTEMS AND METHODS FOR QUERY EVALUATION OVER DISTRIBUTED LINKED DATA STORES

TECHNICAL FIELD

The field generally relates to systems and methods for query evaluation and, in particular, systems and methods for graph query evaluation over distributed linked data stores.

BACKGROUND

A typical customer setting can involve multiple data sources. These data sources are often interconnected. In addition, new sources may be constantly added and existing sources can evolve with business needs.

Customers may, for example, deploy multiple, distributed Resource Description Framework (RDF) data stores containing linked data. A minimal requirement for meaningful data analytics in this setting is the ability to perform query processing over the distributed data stores. Existing query evaluation approaches over distributed stores may require a central repository (e.g., warehouse) to collect all the queried data, or rely on federated solutions whose configuration and maintenance add an extra layer complexity unrelated to individual products and their stores. The former approach requires shipping large quantities of data to the repository. Furthermore, such a centralized approach may violate a number of security or privacy constraints that might be in place in the distributed stores, and may also create the issue of keeping the repository up-to-date, as new data are inserted in the respective stores. The latter approach, which relies on a federation, assumes that a global schema of some sort is created over the distributed stores, and this is used during query evaluation. Known federated systems lack automation to maintain the federation. A federated system can require a large amount of manual work to establish mappings, create global schemas, and maintain these mappings and schemas as sources change or new sources are added in the federation.

SUMMARY OF THE INVENTION

In general, exemplary embodiments of the invention include systems and methods for query evaluation and, in particular, systems and methods for graph query evaluation over distributed linked data stores.

According to an exemplary embodiment of the present invention, a method for query evaluation, comprises receiving a query over a set of distributed data sources, decomposing the query into a set of sub-queries of the query, evaluating each sub-query in the set of sub-queries with respect to each data source in the set of distributed data sources, wherein evaluating comprises determining which data sources in the set of distributed data sources are capable of answering each sub-query, computing a set of distributed plans by composing one or more of the sub-queries in one or more of the data sources, evaluating each plan in the set of distributed plans, selecting a sub-set of plans from the set of distributed plans to be executed for responding to the query, executing the selected sub-set of plans, and returning results of the query.

According to an exemplary embodiment of the present invention, a computer program product for query evaluation, comprises a non-transitory computer readable storage medium having program instructions embodied therewith, the program instructions executable by a processor to cause the processor to perform the above method.

According to an exemplary embodiment of the present invention, an apparatus for query evaluation, comprises a memory, and a processing device operatively coupled to the memory and configured to receive a query over a set of distributed data sources, decompose the query into a set of sub-queries of the query, evaluate each sub-query in the set of sub-queries with respect to each data source in the set of distributed data sources, wherein evaluating comprises determining which data sources in the set of distributed data sources are capable of answering each sub-query, compute a set of distributed plans by composing one or more of the sub-queries in one or more of the data sources, evaluate each plan in the set of distributed plans, select a sub-set of plans from the set of distributed plans to be executed for responding to the query, execute the selected sub-set of plans, and return results of the query.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 1 shows a table which provides a generalized view of integration platforms.

DETAILED DESCRIPTION OF EXEMPLARY EMBODIMENTS

Figure 2:
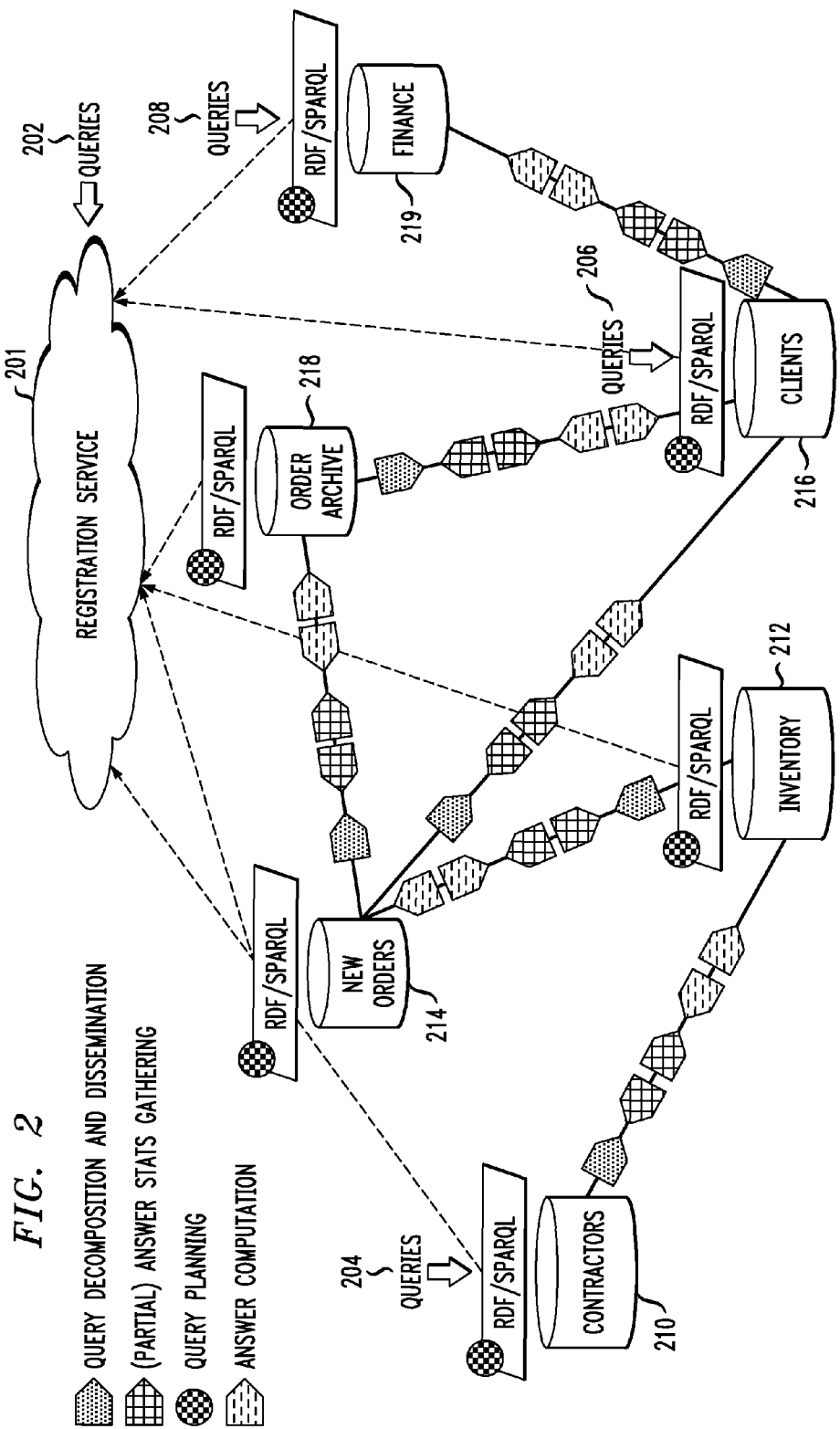
FIG. 2 is a block diagram illustrating a linked data and distributed query architecture in accordance with an embodiment of the present invention.

Exemplary embodiments of the invention will now be discussed in further detail with regard to systems and methods for query evaluation and, in particular, systems and methods for graph query evaluation over distributed linked data stores. This invention may, however, be embodied in many different forms and should not be construed as limited to the embodiments set forth herein.

Embodiments of the present invention provide a distributed, scalable query evaluation mechanism over a dynamic network of enterprise data stores that requires minimal setup and maintenance costs and does not rely on a central repository. For example, embodiments of the present invention provide a method and apparatus for the distributed evaluation of graph queries. According to an embodiment, systems and methods for a Protocol and a Query Language for RDF (e.g. SPARQL), query evaluation over distributed linked data stores are provided. In accordance with embodiments of the present invention, a decomposition of an input graph query into its constituent parts (e.g., sub-queries) is performed. Each such sub-query is evaluated over all underlying data sources and it is determined which sub-queries can be evaluated in which data sources, and what is the cardinality of the sub-query answers. Summarized information about the evaluation of each sub-query (e.g., actual or estimated cardinality of the sub-queries) is exchanged among all the data sources, and a distributed query evaluation algorithm is used in parallel by all the data sources to compute all the possible ways that query results from the various data sources can be combined to provide an answer to the initial query. For each such possible way, a plan is computed and may be evaluated. Some plans that are computed may not necessarily be evaluated because these plans are determined to be inefficient.

The embodiments of the present invention do not require any form of centralization, and can be completely decentralized. In accordance with an embodiment of the present invention, statistical information to facilitate query planning is dynamically collected, for example, at query time, so that schema information or statistics for underlying queried stores are not required.

Embodiments of the present invention may permit a relatively light-weight thin layer to be added on top of existing systems and can have limited to no maintenance requirements. In accordance with embodiments of the present invention, new sources can be added dynamically into a system without the need for reconfiguration.

As used herein, a "data source" or "data store" can refer to a database having a set of related data structured or organized in a particular manner. A data source or data store can include a graph data source or graph data store, which is a database that uses graph structures for semantic queries with nodes, edges, and properties to represent and store data. An example data store is an RDF store, also referred to as a triple store. Many types of stores can be exposed as graph stores; for example, a relational database can also be exposed as a graph store.

As used herein, a "graph query" can refer to a query of a graph database. An example of a graph query is a SPARQL query.

As used herein "distributed data sources" can refer to data sources that are not all attached to a common processing unit. The data sources may be stored in multiple computers located in the same physical location, or may be dispersed over a network of interconnected computers. Distributed data sources can include loosely-coupled sites that do not share physical components.

A typical customer setting often involves multiple (e.g., hundreds or thousands) data stores, heterogeneous data types (e.g., relational database (RDB), Extensible Markup Language (XML), RDF, Javascript® Object Notation (JSON), Microsoft® Excel®), and dynamic data types and locations. Customers sometimes do not know what data they have or where these data reside. A number of alternative architectures can be deployed in such settings. For example, FIG. 1 shows a table which provides a generalized view of data warehousing, distributed data integration system, federated data integration system and linking data integration system integration platforms, in terms of access points, lineage, autonomy, heterogeneity, querying, transactions and performance.

FIG. 2 is a block diagram illustrating a linked data and distributed query architecture in accordance with an embodiment of the present invention. Referring to FIG. 2, a plurality of data sources 210, 212, 214, 216, 218 and 219 are shown. The illustrated data sources are shown by way of example, and the embodiments of the present invention are not limited thereto. The illustrated data sources include contractors 210, inventory 212, new orders 214, clients 216, order archive 218 and finance 219. The data sources inter-connected and new data sources can be added and/or existing data sources may evolve with business needs. Such a data source environment may occur in, for example, the banking, healthcare, or retail industry.

Embodiments of the present invention are applicable to data sources that store graphs, for example, natively, or as relational stores with a graph front-end. The embodiments of the present invention provide the ability to query across graph-source boundaries, by providing a distributed query evaluation mechanism that does not require (1) shipping of data to a central warehouse; (2) a central federator for coordinating and merging partial results from distributed data sources; or (3) the use of a global schema or statistics to evaluate queries.

Figure 3:
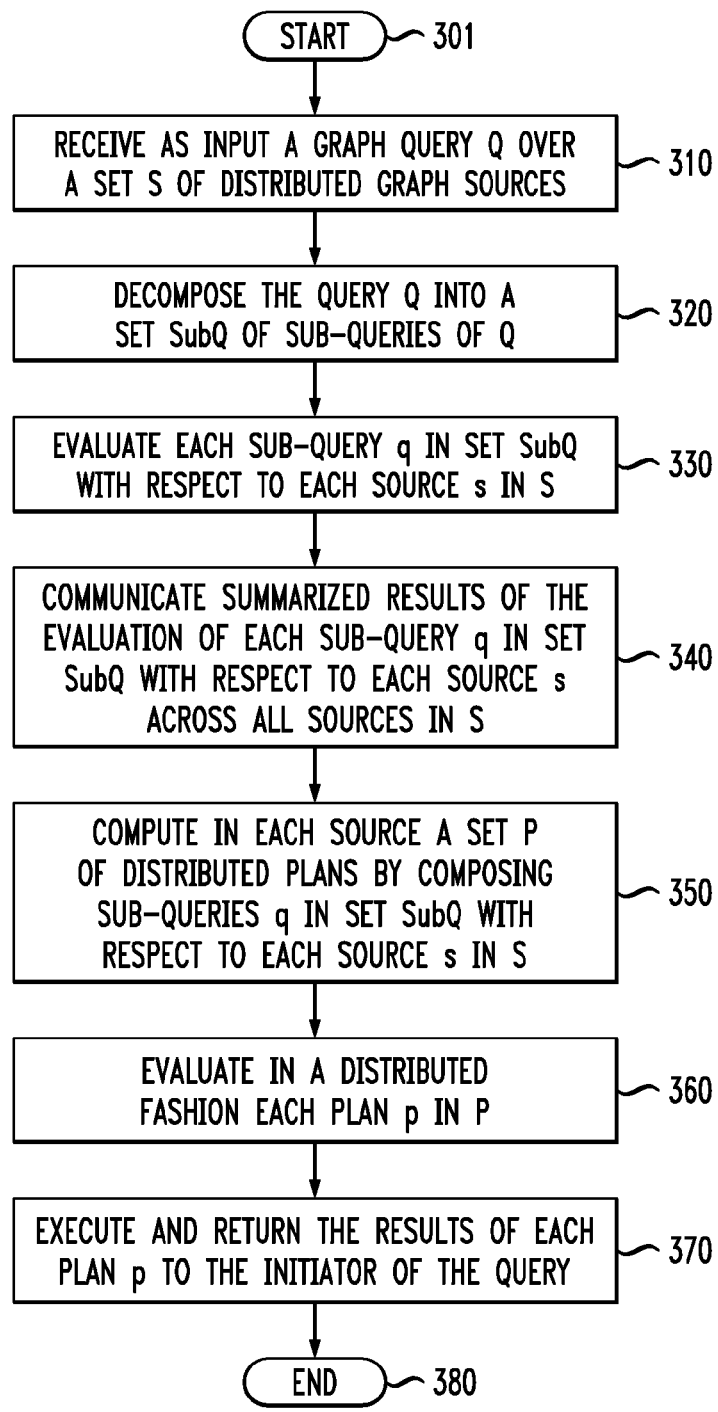
FIG. 3 is a flow diagram of a process for query evaluation, according to an exemplary embodiment of the invention.

FIG. 3 is a flow diagram illustrating a method for query evaluation, in accordance with an exemplary embodiment of the present invention. The method for query evaluation 300 comprises receiving as input a graph query Q over a set S of distributed graph sources (block 310). The set S of graph sources can include any number of data sources, such as, for example, the data sources 210, 212, 214, 216, 218 and 219 shown in FIG. 2. It is to be understood that the embodiments of the present invention are not limited to these data sources, and other combinations of graph data sources may be used. The method further comprises decomposing the query Q into a set SubQ of sub-queries of Q (block 320). For example, a query may have multiple conditions, and sub-queries can correspond to one or more of the conditions. A query may state, for example, how many people work at IBM who live in Dublin, Ireland and are also male. That query may be decomposed into sub-queries, such as, how many people work at IBM who live in Dublin, Ireland, how many people work at IBM and are male, how many people work at IBM, how many people live in Dublin, Ireland, how many people are male, etc.

The method 300 further comprises evaluating each sub-query q in set SubQ with respect to each source s in S (block 330). In this step, it is determined which sub-queries q can be answered through certain data sources s in the set S of data sources. In other words, it is determined from which data source (e.g., node) can the requested information in each sub-query be obtained. Some data sources may provide certain information while others provide different information, or different data sources may ultimately provide the same information, but in formats or through different iterations. At block 340, the results of the evaluation of each sub-query q in set SubQ with respect to each source s in S from step 330 are summarized and communicated across all of the data sources in S. The communication includes the identification of local and remote statistics for each data source. With respect to each data source, local statistics refer to the information (e.g., the number of results for each of the sub-queries q) that a data source itself has, and remote statistics refer to the information that is obtainable from data sources other than the data source itself (e.g., other nodes).

At block 350, the method further comprises computing, in each data source determined to be capable of answering a sub-query, a set P of distributed plans p. The computing is performed by composing one or more sub-queries q from the set SubQ in those data sources s determined to be capable of answering a sub-query. It is determined in step 350 a nature of information (e.g., the type, volume and/or form) being provided by each data source in response to the composed sub-queries for that source, and the cost associated with obtaining the information. The cost is based on such factors as, for example, memory and time needed for each sub-query q. For example, two data sources may be able to obtain the same information, but one source may be able to obtain the information at less cost than the other (e.g., in simpler form and with less volume), so that it may be more efficient for the one source to obtain the information and provide it to the other data source. The set P of distributed plans p includes a plan p for each sub-query, and corresponding source with results for that sub-query, based on the appropriateness of each data source for responding to a sub-query. At block 360, each plan p in the set P is evaluated in a distributed fashion. In other words, the data plans p from each data source are compared with each other with respect to costs of each plan, and the processes each plan will follow. The super plan for responding to the query is selected, which includes one or more of the sources executing sub-queries and exchange of necessary information between each of the data sources that are part of the super plan. The super plan includes a sub-set of plans from the set of distributed plans to be executed for responding to the query. The super plan is selected based on, for example, efficient allocation of data sources based on, for example, lowest cost and availability of computing resources and/or data sources.

The method further comprises, at block 370, executing the super plan, including each source performing their part of the plan (e.g., executing sub-queries in a data source, and forwarding results of the execution to the appropriate node). At the conclusion of the super plan, and after forwarding the partial results from and to all necessary data sources, the method further comprises compiling the final results of the super plan, and returning the final results to the initiator of the query Q to provide a response to the query Q. In accordance with an embodiment of the present invention, the results of each plan p in the set P of distributed plans are compiled, and the compiled results are returned to the initiator of the query Q to provide a response to the query Q.

Referring back to FIG. 2, in accordance with embodiments of the present invention, participating data sources can dynamically determine whether they can participate in evaluation of a query, dynamically contribute statistics for query planning, and dynamically aggregate partial results to evaluate queries. In FIG. 2, the registration service 201 provides the user with the data sources that can be part of the linked system. A user can select or add data sources to the linked architecture through the registration service. Alternatively, or in addition, a user could also add data sources by connecting to an already known data source instead of the registration service. Accordingly, the registration service is not necessarily required. Queries Q 202 can be initiated via the registration service 201, and a user can receive a response to the query via the registration service. Alternatively, queries Q, for example, queries 204, 206 and 208, can be initiated at a data source. A query can be received via, for example, a user interface corresponding to the registration service and/or the data source. With respect to each data source 210, 212, 214, 216, 218 and 219, a query Q (202, 204, 206 and 208) is received, decomposed as described above, and as shown by the dotted arrows facing away from each data source, disseminated to other data sources within a linked group of data sources.

As noted above, with respect to each data source 210, 212, 214, 216, 218 and 219, local statistics refer to the information (e.g., the answers to sub-queries q) that a data source itself has, and remote statistics refer to the information that is obtainable from data sources other than the data source itself (e.g., other nodes). The arrows with the grids between the data sources and facing toward and away from the data sources, represent statistics gathering between the data sources. The answers or partial answers to the decomposed queries are exchanged between the data sources 210, 212, 214, 216, 218 and 219.

The circles with the boxes therein represent query planning. As noted above, sub-queries q are composed for each data source, where it is determined which data sources can run which sub-queries, and the cost associated therewith. A plan p for each of the sub-queries corresponding to each source is evaluated in a distributed fashion to determine the sub-queries to be executed by each of the participating sources, and the exchange of necessary information between each of the data sources that are part of the super plan. As shown, the queries can be executed using RDF and SPARQL techniques, but the embodiments of the present invention are not necessarily limited thereto.

The arrows with the dashes represent answer computation. Once the super plan is received at each data source, each source performs their part of the plan. For example, each data source executes sub-queries, and, as shown by the dashed arrows, each data source forwards and/or receives results of the execution to and from the appropriate node. Each data source can be considered a node.

Figure 4:
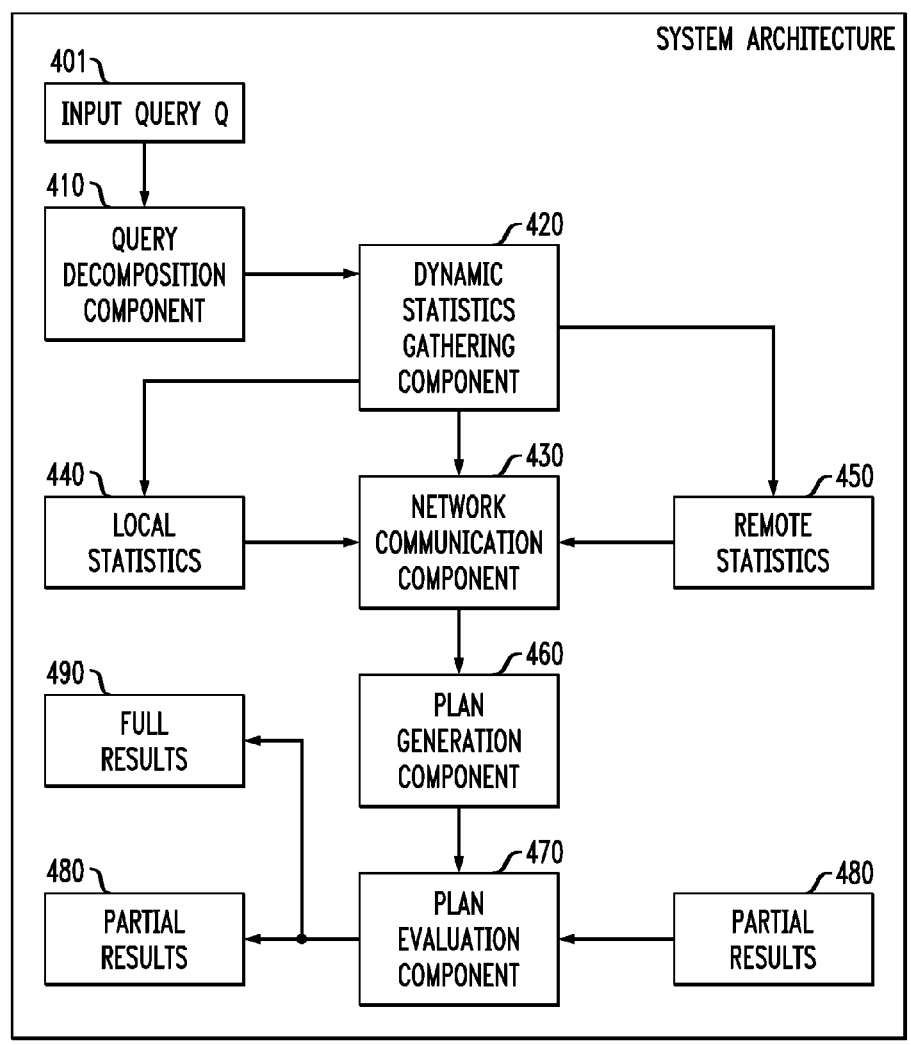
FIG. 4 is a diagram of a system for query evaluation, according to an exemplary embodiment of the invention.

FIG. 4 shows a system for query evaluation, in accordance with an embodiment of the present invention. As shown in FIG. 4 by lines and/or arrows, the components of the system 400 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

The system 400 for query evaluation, comprises a query decomposition component 410, dynamic statistics gathering component 420, network communication component 430, plan generation component 460 and plan evaluation component 470. Referring to FIGS. 2 and 4, each of the components 410, 420, 430, 460 and 470 may correspond to and perform operations for more than one of the data sources, for example, all of the data sources, so that multiple data sources are connected to the same components 410, 420, 430, 460 and 470. Alternatively, each of the components 410, 420, 430, 460 and 470 can correspond to and perform operations for a particular data source 210, 212, 214, 216, 218 and 219, so that there is a set of components for each data source. For purposes of explanation, it is assumed that each of the components 410, 420, 430, 460 and 470 correspond to and perform operations for all of the data sources, so that each of the data sources is connected to the same components 410, 420, 430, 460 and 470.

As described herein above, an input query Q is received via, for example, an interface corresponding to a data source or an interface corresponding to a registration service. The input query Q is received by the query decomposition component 410, which decomposes the query Q into a set SubQ of sub-queries of Q as described above. The dynamic statistics gathering component 420 evaluates each sub-query q in set SubQ with respect to each source, determining which sub-queries q can be answered through certain data sources s in the set S of data sources. The results of the evaluation of each sub-query q in set SubQ with respect to each source are summarized and communicated via the network communication component 430 across all of the data sources in the set S. The communication includes the identification of local and remote statistics 440, 450 for each data source, including, for example, the cardinality of the sub-query answers.

The plan generation component 460 computes, for each data source, a set P of distributed plans p by composing the sub-queries q in set SubQ with respect to each source s in S. In other words, the plan generation component 460 determines which data sources can run which sub-queries, and the cost associated therewith. The plan evaluation component 470 evaluates each plan p in the set P in a distributed fashion. The plan evaluation component 470 compares the data plans p from each data source with each other with respect to costs of each plan, and the processes each plan will follow. The plan evaluation component 470 selects a super plan for responding to the query, which includes one or more of the sources executing sub-queries, and exchange of necessary information between each of the data sources that are part of the super plan.

The plan evaluation component 470 receives partial results 480 of execution of their parts of the super plan from each of the data sources (e.g., results of executing sub-queries or portions of sub-queries). The plan evaluation component 470 forwards the partial results 480 of the execution to the next appropriate data source according to the super plan. At the conclusion of each plan, after receiving and forwarding partial results from and to all necessary data sources, the plan evaluation component 470 compiles the final results 490 of the plan, and returns the final results 490 to the initiator of the query Q. The combination of the final results of each plan provides a response to the query Q.

Embodiments of the present invention provide systems and methods for query evaluation over distributed linked data stores that utilizes a registration service to result in minimal setup burdens for a user. Embodiments of the present invention allow for a SPARQL endpoint and dynamic configuration, without creation of a global schema, without gathering of schema information, and with no requirement for information on data statistics. In accordance with embodiments of the present invention, data source additions/deletions are easily handled, and parallel query evaluation with performance guarantees is possible. Other than not contributing to the query answers, source failures do not influence the evaluation of queries.

The embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
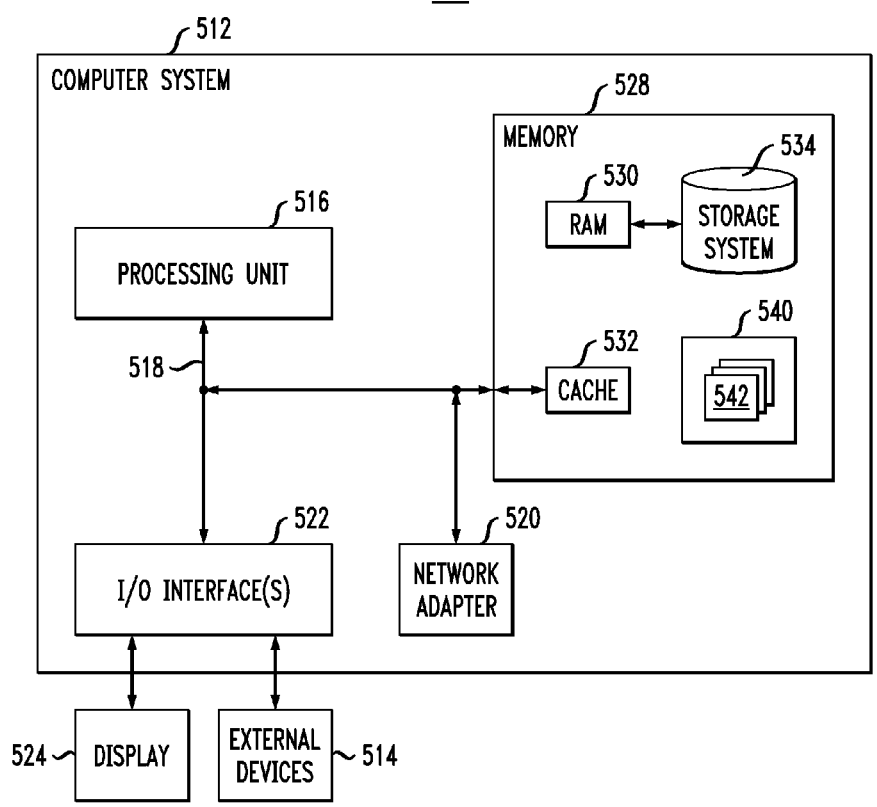
FIG. 5 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for query evaluation, comprising:

implementing a data query evaluation system at each data source of a set of distributed and networked linked data sources, wherein the distributed and network linked data sources respectively correspond to a plurality of nodes connected over a network, wherein the data query evaluation system at each data source is configured for:

receiving a query over the set of distributed and network linked data sources;

decomposing the query into a set of sub-queries of the query;

evaluating each sub-query in the set of sub-queries with respect to each data source in the set of distributed and network linked data sources, wherein evaluating comprises determining which data sources in the set of distributed and network linked data sources are capable of answering each sub-query, wherein each data source of the set of distributed and networked linked data sources dynamically determines whether it is capable of answering each sub-query;

summarizing results of the evaluating of each sub-query;

exchanging between the distributed and networked linked data sources the summarized results of the evaluating, wherein each data source of the set of distributed and networked linked data sources dynamically provides the summarized results;

executing, in parallel by the distributed and networked linked data sources, a distributed query evaluation process to compute a plurality of combinations of query results from the distributed and networked linked data sources which provide an answer to the query;

computing a set of distributed plans by composing one or more of the sub-queries in one or more of the distributed and networked linked data sources;

evaluating each plan in the set of distributed plans;

selecting a sub-set of plans from the set of distributed plans to be executed for responding to the query;

executing the selected sub-set of plans, wherein executing the selected sub-set of plans comprises:

an exchange of data between each of the distributed and networked linked data sources that are part of the selected sub-set of plans;

executing a plurality of sub-queries in respective ones of the distributed and networked linked data sources that are part of the selected sub-set of plans; and forwarding results of the execution of one or more given sub-queries of the plurality sub-queries to one or more data sources of the distributed and networked linked data sources that are part of the selected sub-set of plans, and which did not perform the one or more given sub-queries, wherein the results comprise answers and partial answers to the given sub-queries; and returning results of the query;

wherein the implementing of the data query evaluation system at each data source is performed without: (i) transmission of queried data to a central repository; (ii) using a central federator for coordinating and merging the partial answers from the one or more data sources of the distributed and networked linked data sources that are part of the selected sub-set of plans; and (iii) using a global schema to evaluate the query; and wherein the steps of the method are performed via at least one processing device and at least one memory.

2. The method according to claim 1, wherein the query comprises a graph query and the data sources comprise graph data sources.

3. The method according to claim 1, wherein the summarized results include an identification of local statistics and remote statistics for each data source.

4. The method according to claim 1, further comprising determining a nature of information being provided by a data source in response to a composed sub-query for that data source, and determining a cost associated with obtaining the information.

5. The method according to claim 4, wherein the cost is based on at least one of memory and time needed for the composed sub-query.

6. The method according to claim 1, wherein evaluating each plan comprises comparing the set of distributed plans with each other with respect to a cost of each plan.

7. The method according to claim 1, wherein the one or more of the sub-queries are composed in each data source determined to be capable of answering a sub-query.

8. The method according to claim 1, further comprising compiling results of the executing of the selected sub-set of plans.

* * * * *